United States Patent
Kim (10) Patent No.: US 8,989,975 B2
(45) Date of Patent: Mar. 24, 2015

(54) SMART TOUCH TYPE ELECTRONIC AUTO-SHIFT LEVER

(71) Applicant: Hyundai Motor Company, Seoul (KR)

(72) Inventor: Eun-Sik Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/106,746

(22) Filed: Dec. 14, 2013

(65) Prior Publication Data

US 2014/0283639 A1  Sep. 25, 2014

(30) Foreign Application Priority Data

Mar. 19, 2013  (KR) .................. 10-2013-0029314

(51) Int. Cl.
*G06F 17/00* (2006.01)
*F16H 59/08* (2006.01)

(52) U.S. Cl.
CPC ..................................... *F16H 59/08* (2013.01)
USPC ......................................................... 701/56

(58) Field of Classification Search
None
See application file for complete search history.

(56) References Cited

U.S. PATENT DOCUMENTS

| 4,583,171 | A | 4/1986 | Hara et al. | |
|---|---|---|---|---|
| 7,376,510 | B1 * | 5/2008 | Green | 701/436 |
| 7,505,842 | B2 * | 3/2009 | Luh | 701/55 |
| 8,447,460 | B2 * | 5/2013 | Nihei et al. | 701/29.2 |
| 2012/0041655 | A1 * | 2/2012 | Thooris | 701/52 |
| 2013/0145360 | A1 * | 6/2013 | Ricci | 717/174 |

FOREIGN PATENT DOCUMENTS

| JP | 2000-240774 A | 9/2000 |
|---|---|---|
| JP | 2006-177401 A | 7/2006 |

* cited by examiner

*Primary Examiner* — Dirk Wright
(74) *Attorney, Agent, or Firm* — Morgan, Lewis & Bockius LLP

(57) ABSTRACT

A smart touch type electronic auto-shift lever may include a shift stage controller which is connected to a controller of an electronic auto-transmission of a vehicle and a touch screen which is arranged on a console of a vehicle and is connected to the shift stage controller to display information of a shift pattern received from the shift stage controller and transmit input information produced by a touch to the shift stage controller. The shift stage controller generates the information of the shift pattern including the shift pattern and transmits it to the touch screen, and generates stage shift information allotted to the input information received from the touch screen and transmits it to the controller of the electronic auto-transmission of the vehicle.

7 Claims, 7 Drawing Sheets

SMART TOUCH TYPE ELECTRONIC AUTO-SHIFT LEVER

CROSS-REFERENCE TO RELATED APPLICATION

The present application claims priority of Korean Patent Application Number 10-2013-0029314 filed on Mar. 19, 2013, the entire contents of which application are incorporated herein for all purposes by this reference.

BACKGROUND OF INVENTION

1. Field of Invention

The present disclosure relates to an electronic auto shift lever, more particularly, to an electronic auto-shift lever in which a shift operator is configured to include a touch screen in an automatic shift lever of an automatic transmission vehicle, and pre-set shift patterns are provided to a driver and the shift operation is performed by input through the touch screen wherein the shift patterns may be varied randomly or intentionally by the driver thereby to provide various shift patterns to the driver in response to his/her preference.

2. Description of Related Art

Generally, a shift lever provided in a vehicle to control the shift stages of the vehicle is classified as a manual shift lever and an electronic shift lever, and recently the trend of using the electronic shift lever is increasing.

In the case of the electronic shift lever, it is commonly arranged on a console beside a driver's seat and the lever is protruded above the console to be operated easily by a driver. Here, an operational sense of the electronic shift lever similar to that of the conventional mechanical shift lever is provided to the driver to control easily the shift stages through the configuration of the shift lever as described above.

Figure 1:
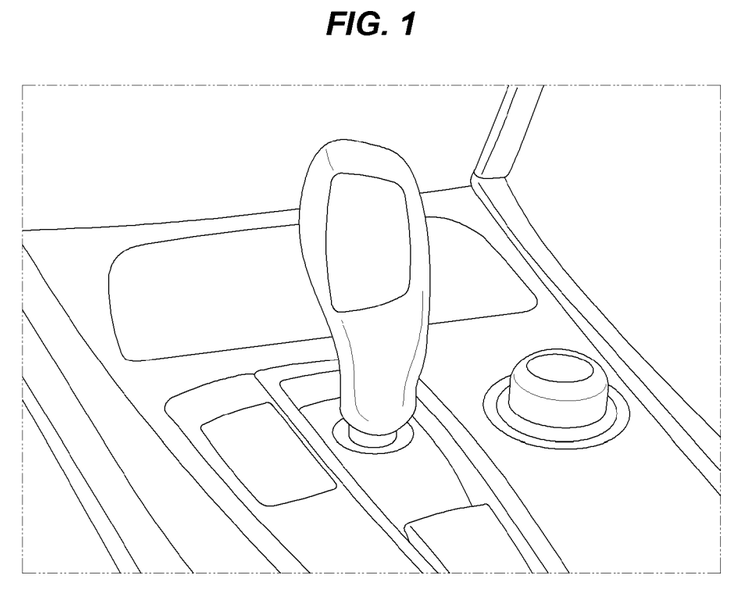
FIG. 1 is a picture showing an electronic shift lever according to a related art.
Figure 2:
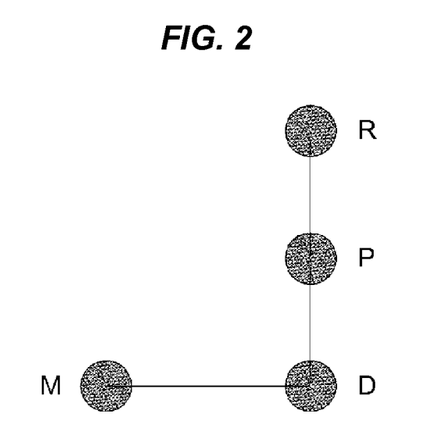
FIG. 2 is a perspective view showing a shift pattern of an electronic shift lever formed in a linear type according to a related art.
Figure 3:
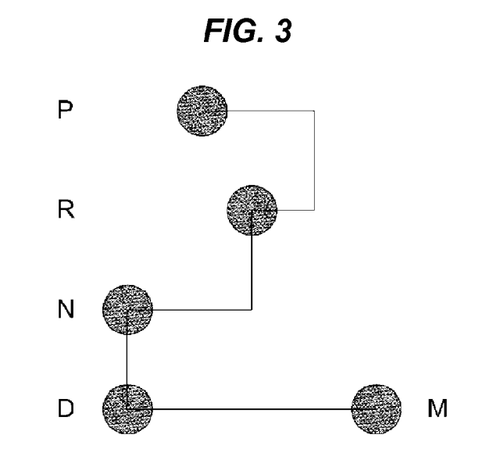
FIG. 3 is a view showing a shift pattern of a mechanical shift lever formed in a gate type according to a related art.

FIG. 1 is a picture showing an electronic shift lever according to a related art, FIG. 2 is a view showing a shift pattern of an electronic shift lever which is operated in a linear type according to a related art and FIG. 3 is a view showing a shift pattern of a mechanical shift lever operated in a gate type, according to the related art.

As shown in the drawings, a shift pattern of an electronic shift lever according to a related art is formed as a relatively simple straight line shape, comparing to the shift pattern of a mechanical shift lever formed in a gate type according to a related art. The electronic shift lever according to a related art is provided separately with a button for controlling a P stage and thus the shift pattern thereof can be further simplified compared to the shift pattern of the mechanical shift lever according to a related art.

However, the electronic shift lever as configured above according to a related art has some drawbacks as below.

For example, a shift lever is fixed to a console and thus it is difficult to operate the shift lever at a desired location. A shift pattern of the shift lever is constant as a pre-set shape, generally as a linear shape, and thus is unchangeable to be responsive to the various demands from the users who are accustomed to operating the shift pattern of the mechanical shift lever according to a related art. The shift pattern is similar to that of the mechanical shift lever according to a related art (the lever is operated forward/backward) and thus it is difficult to experience the advantages of introducing the electronic shift lever.

Further, a space of a predetermined volume has to be allotted to accommodate the shift pattern when the shift lever moves along the shift pattern, and in this case the space occupied by the electronic shift lever is large, and thus an indoor space of a vehicle, for example, a space for receiving a cup holder becomes relatively small and a space for allotting necessary button functions is not ensured sufficiently.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve at least some of the above-described problems associated with the prior art.

Various aspects of the present invention provide for a smart touch type electronic auto-shift lever for an automatic shift lever of an automatic transmission of a vehicle, in which the shift operator of the automatic shift lever includes a touch screen, and the shift operation is performed by inputting through the touch screen while the pre-set shift pattern is provided to a user wherein the shift pattern can be varied at random or intentionally by the user thereby providing various shift patterns corresponding to the user's preference.

Various aspects of the present invention provide for a smart touch type electronic auto-shift lever according to the present invention that may include: a shift stage controller which is connected to a controller of an electronic auto-transmission of a vehicle; and a touch screen which is arranged on a console of a vehicle and is connected to the shift stage controller to display information of a shift pattern received from the shift stage controller and transmit input information produced by a touch to the shift stage controller, wherein the shift stage controller generates the information of the shift pattern including the shift pattern and transmits it to the touch screen, and generates stage shift information allotted to the input information received from the touch screen and transmits it to the controller of the electronic auto-transmission of the vehicle.

The shift stage controller may store the shift stage information of shift stages including P stage, R stage, N stage, D stage, M stage, + stage and − stage, location information including a location where a shift stage contained in the shift stage information is to be displayed and relative location information including relative locations between respective shift stages contained in the shift stage information, as pre-set information, generate the information of the shift pattern based on the shift stage information, the location information and the relative location information, and transmit the information of the shift pattern to the touch screen.

The relative location information may be configured by storing the relative locations of the respective shift stages for the P stage, R stage, N stage, D stage and M stage to be arranged in sequence among the shift stages contained in the shift stage information, as pre-set information.

The shift stage controller may provide information of a button for varying pattern to the touch screen, the touch screen may display the button for varying the pattern based on the information of the button for varying the pattern, and the shift stage controller may control the shift pattern to be varied in accord with input of the button for varying the pattern.

The shift stage controller may generate the stage shift information and output it only when the input information received from the touch screen is input in sequence along a sequence arrangement of P stage, R stage, N stage, D stage and M stage.

The relative location information may include the relative location information including a first relative location information and a second relative location information, which set different shift patterns, respectively, as pre-set information, the shift stage controller may provide information of a button for converting a mode to the touch screen, the touch screen may display the button for converting the mode based on the information of the button for converting the mode, and the shift stage controller may control the relative location information to be cross-converted into one of the first relative location information or the second relative location information in accord with input of the button for converting the mode.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 4:
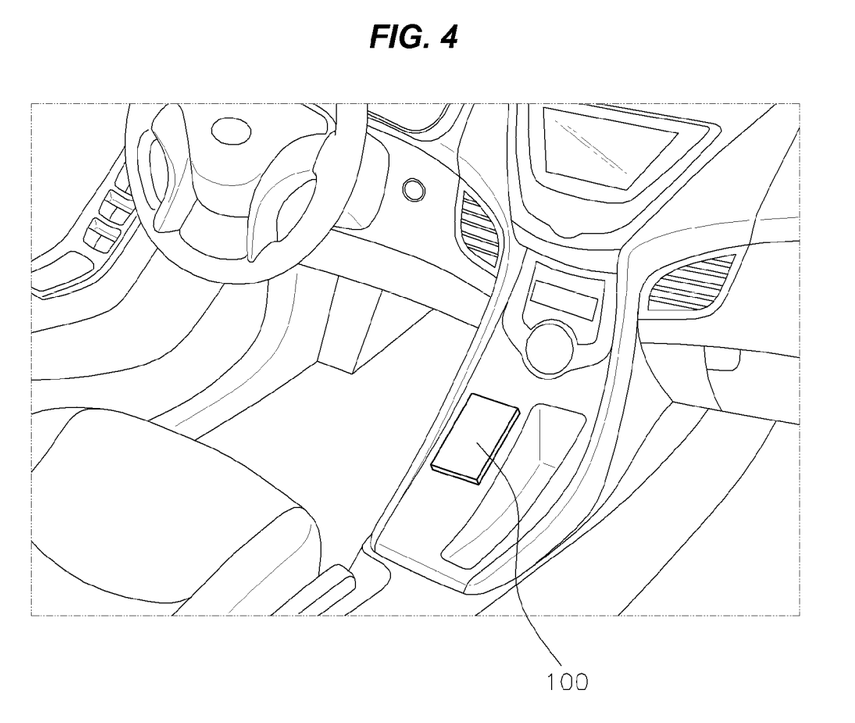
FIG. 4 is a perspective view showing a driver's seat on which an exemplary smart touch type electronic auto-shift lever is arranged according to the present invention.
Figure 5:
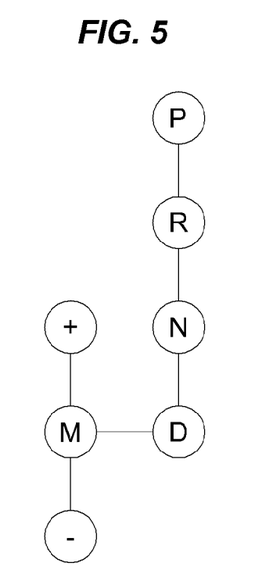
FIG. 5 is a perspective view showing a shift pattern provided by an exemplary smart touch type electronic auto-shift lever according to the present invention.

FIG. 4 is a perspective view showing a driver's seat on which a smart touch type electronic auto-shift lever is arranged and FIG. 5 is a perspective view showing a shift pattern provided by a smart touch type electronic auto-shift lever according to various embodiments of the present invention. As shown in the drawings, a smart touch type electronic-auto shift lever 100 according to various embodiments of the present invention is provided with an operator configured with a touch screen as an input means, instead of a shift lever of an electronic transmission which is disposed generally on a console inside a vehicle.

A driver who drives a vehicle to which the smart touch type electronic-auto shift lever 100 is applied may control the stage shift by touching the shift stages displayed on a touch screen, instead of using a publicly known electronic shift lever. Accordingly, the internal space occupied by a conventional shift lever is not required in a vehicle to which the present invention is applied, comparing to a vehicle in which a conventional automatic shift lever is provided, thereby increasing a receiving space for other components and ensuring a space of a driver's seat in a vehicle.

The smart touch type electronic auto-shift lever 100 according to the present invention includes a shift stage controller which is connected to a controller of an electronic auto-transmission of a vehicle and a touch screen which is arranged on a console of a vehicle and is connected to the shift stage controller to display the received information of the shift pattern therefrom and transmit the input information produced by a touch to the shift stage controller.

The touch screen is arranged on a console inside a vehicle, preferably on a location where the publicly known electronic shift lever is arranged. Accordingly, the touch screen is arranged on a location similar to the place to which a driver who has driven a vehicle using a conventional electronic shift lever is accustomed thereby to prevent confusion of the driver to find the shift lever.

The touch screen may be any known touch screens which display the information and to which the information produced by a touch is input, for example, such as a capacitive touch screen or a pressure sensitive touch screen, etc.

The shift stage controller is provided for controlling the touch screen wherein it may be installed preferably on an internal side of the console on which the touch screen is arranged, but it is not limited thereto.

Further, the shift stage controller may include a publicly known electronic circuit unit (ECU), and further any control means which is provided for controlling the touch screen may be adopted, in addition to the ECU. The detailed description thereof is omitted.

The shift stage controller may store preferably the information of the shift stages including P stage, R stage, N stage, D stage, M stage, + stage and − stage, the location information including a place where the shift stage contained in the information of shift stage is to be displayed and the information of relative location between the respective shift stages contained in the information of shift stage, as pre-set information.

Accordingly, the shift stage controller generates the information of shift pattern based on the shift stage information, the location information and the relative location information and then transmits the shift pattern information to the touch screen.

The shift pattern information sent through the shift stage controller is displayed on the touch screen and when an input is sent by a user through the displayed shift stage information to the touch screen, the touch screen generates the input information in accordance with the input by a user and transmits the input information to the shift stage controller.

As a result, the shift stage controller generates the stage shift information which is allotted to the input information received from the touch screen and transmits the stage shift information to the controller of the electronic auto-transmission of a vehicle thereby to shift finally stage.

Meanwhile, the P stage, R stage, N stage, D stage and M stage may be arranged in sequence in the relative location information between the respective shift stages contained in the shift stage information, which is stored by the shift stage controller, according to various embodiments of the present invention, as shown in FIG. 5. Preferably, the + stage and the − stage may be arranged in a facing direction based on the M stage.

The arrangement of the respective shift stages may be corresponded to an arrangement of shift stage provided by the conventional electronic shift lever, as shown in FIG. 5, and the relative location information is pre-set in accordance with the relative location of the respective shift stages when the shift stages are arranged. Accordingly, a driver may shift a random or selected stage to an adjacent stage in sequence when shifting stages along the arrangement of the shift stage as described above.

Figure 6:
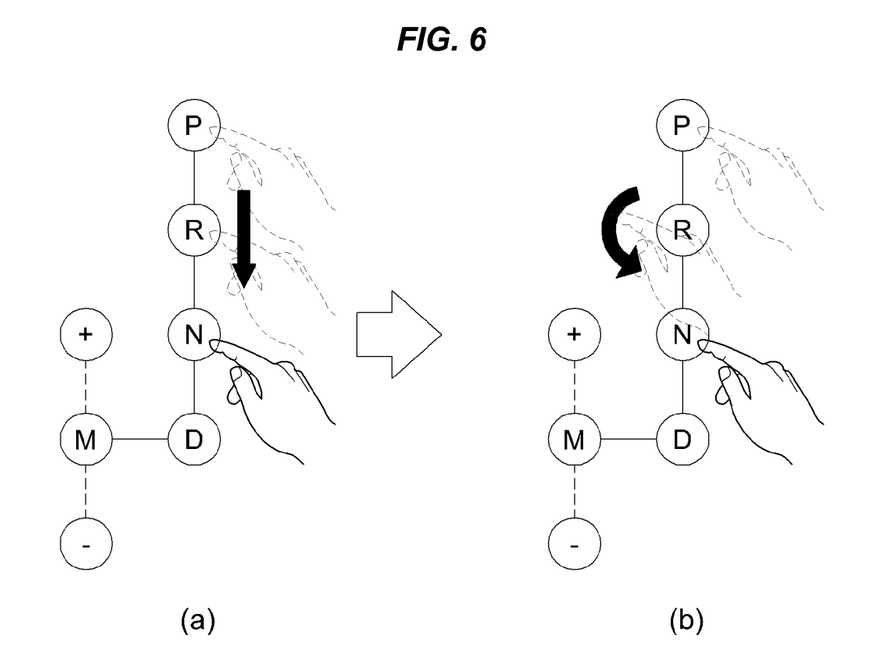
FIG. 6 is a perspective view showing a stage shift procedure of an exemplary smart touch type electronic auto-shift lever according to the present invention.

FIG. 6 is a perspective view showing a stage shift procedure of a smart touch type electronic auto-shift lever according to various embodiments of the present invention. As described above, the shift stages provided through the touch screen are arranged as in sequence of P, R, N, D and M stages. At this time, in some embodiments, it may be preferably that the order of P-R-N-D-M has to be followed when shifting stages.

For example, when a driver intends to shift P stage to N stage, as shown FIG. 6a, he/she may shift by operating P→R→N stages as a shift pattern, but as shown FIG. 6b, it may be impossible for him/her to shift by only operating P→N stages as a shift pattern. This intends to prevent an unintentional shift through error-input from the touch screen and at the same time to prevent confusion caused by the difference of the shift pattern from that of the conventional electronic shift pattern.

Figure 7:
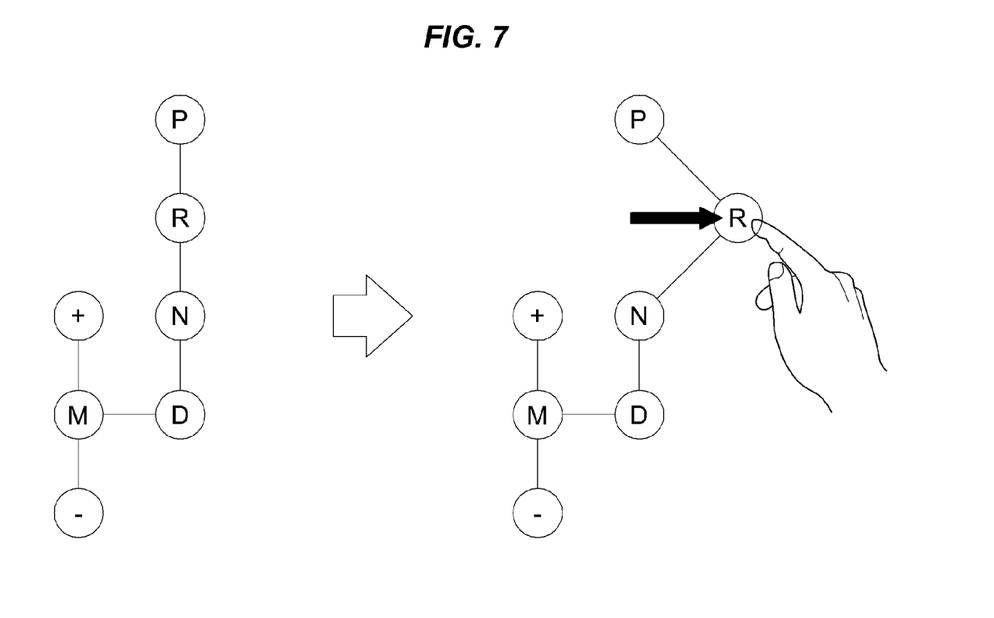
FIG. 7 and FIG. 8 are views showing exemplary variations of the shift patterns according to the present invention.
Figure 8:
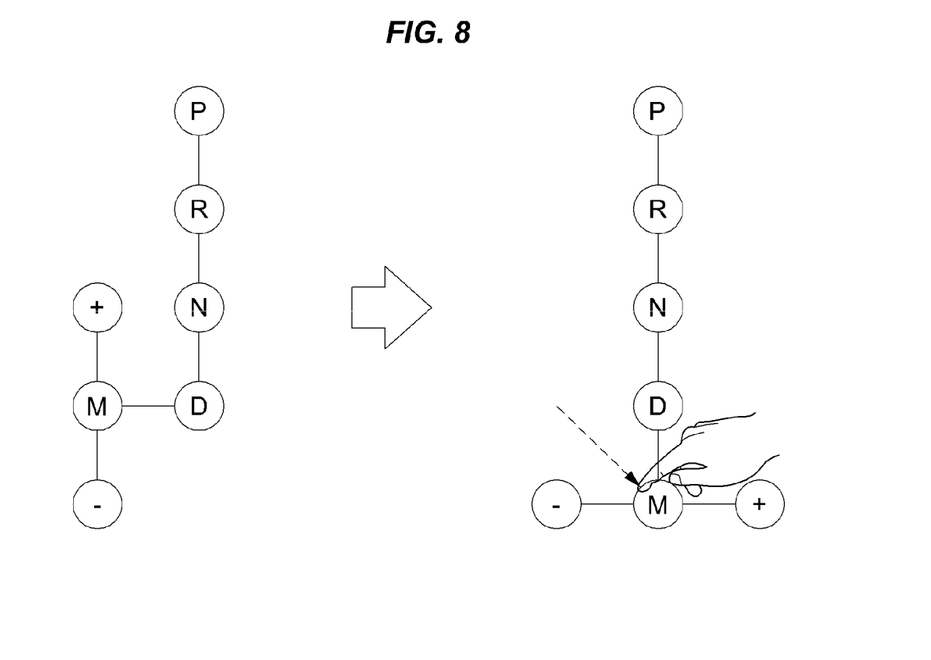

FIGS. 7 and 8 are views showing the variations of the shift patterns according to various embodiments of the present invention. According to the present invention, a user may vary randomly or intentionally the arrangement of the shift stages by changing the relative location of the respective shift stages of the shift pattern provided as described above. In this case, a sequential arrangement of the respective shift stages (the arrangement order of the shift stages of P stage, R stage, D stage, M stage) is to be kept wherein the locations where the respective shift stages are arranged may be varied to a predetermined interval.

This procedure may be performed preferably by touching and dragging a random shift stage displayed on the touch screen, but the present invention is not limited thereto and thus any suitable means including those publicly known in which a random shift stage is touched and then the location to be varied is touched may be applied.

FIG. 7 is a view showing a procedure of varying a location of R stage wherein the locations of the P stage, N stage and D stage may be varied as the same way as the R stage. At this time, in some embodiments, it may be preferably that the sequential arrangement order of the respective shift stages, that is, the order of P-R-N-D-M has to be kept and when the location of one of the shift stages is moved, the locations of the adjacent shift stages may be varied corresponding to the movement of one shift stage, considering of the relative locations of the respective shift stages.

In an original arrangement of the respective shift stages as being arranged in sequence of P-R-N-D-M as shown in FIG. 7, a random shift stage to be moved, for example, the R stage is moved to a set location by touching and dragging it, as shown in FIG. 7. In this case, the relative location of the R stage set in the shift stage controller is varied and the pre-set values with respect to the shift stages adjacent to the R stage, that is, the P stage and N stage are varied.

FIG. 8 is a view showing an arrangement variation of + stage and − stage. As shown in the drawing, the + stage and the − stage are arranged in a facing direction based on the M stage and the arrangement thereof is pre-set as the relative locations thereof.

According to various embodiments of the present invention, the relative locations of the + stage and the − stage are not to be varied, that is, even when the M stage is moved to any directions, the + stage and − stage are moved together to be disposed in a facing direction based on the M stage.

Figure 9:
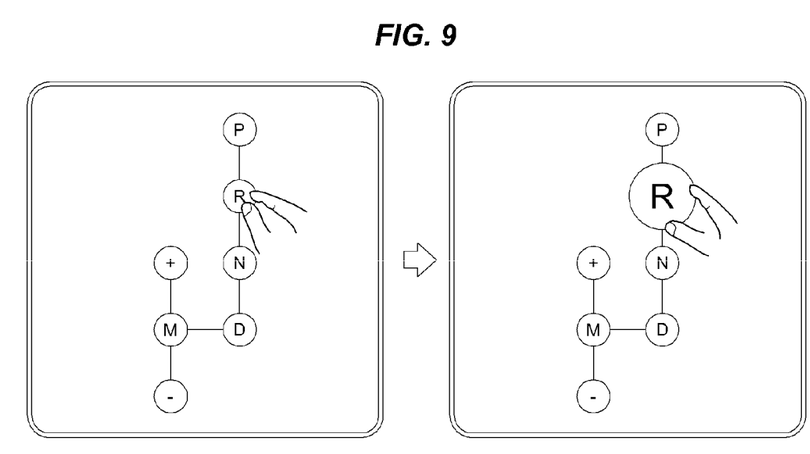
FIG. 9 is a perspective view showing an exemplary procedure of varying a size of the respective shift stages according to the present invention.

FIG. 9 is a view showing size variations of the respective shift stages displayed on the shift pattern. According to the present invention, a readability and an operational property can be improved by varying the sizes of the shift stages displayed on the touch screen.

The size variations of the shift stages are made through the input from the touch screen wherein the size variation may be made through two or more inputs. For example, as shown in FIG. 9, a random shift stage to be varied in a size is touch-input wherein the shift stage is touched with two fingers and the interval between the respective locations which are touch-input is enlarged thereby to vary the size of the shift stage, but with respect to varying the sizes of the displayed shift stages it is not limited thereto and thus any input through the touch screen may be adopted to vary the sizes of the displayed shift stages as preset parameters.

Figure 10:
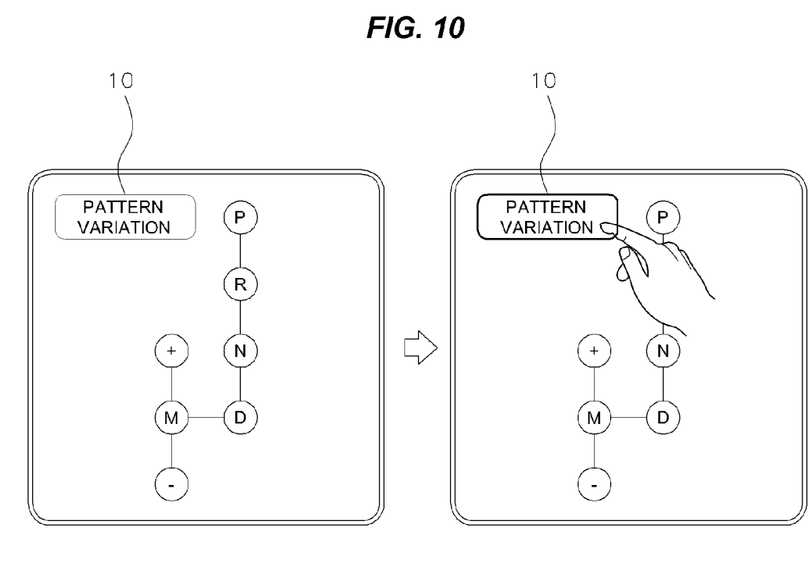
FIG. 10 is a perspective view showing an exemplary button for varying the shift patterns provided on a touch screen according to the present invention.

FIG. 10 is a view showing a button for varying the shift pattern provided on the touch screen. The smart touch type electronic auto-shift lever according to the present invention is operated through the touch screen and since a physical force for the operation is not applied greatly thereto, error-input may occur. Accordingly, a separate button 10 for varying the shift pattern may be further provided so as to prevent an unintended operation of the touch screen to vary the shift pattern.

The button 10 for varying the shift pattern is to be displayed on the touch screen in accordance with the information of the button for varying the shift pattern, which is provided to the touch screen from the shift stage controller. The information of the button for varying the shift pattern may include the image of the button 10 for varying the shift pattern, which is displayed on the touch screen. Accordingly, the button 10 for varying the shift pattern is displayed at a random location on the touch screen and lighted as ON/OFF when the touch is input, to indicate a state in which the pattern can be varied, and the shift stage controller controls to vary the shift patterns provided on the touch screen when the touch is input.

Figure 11:
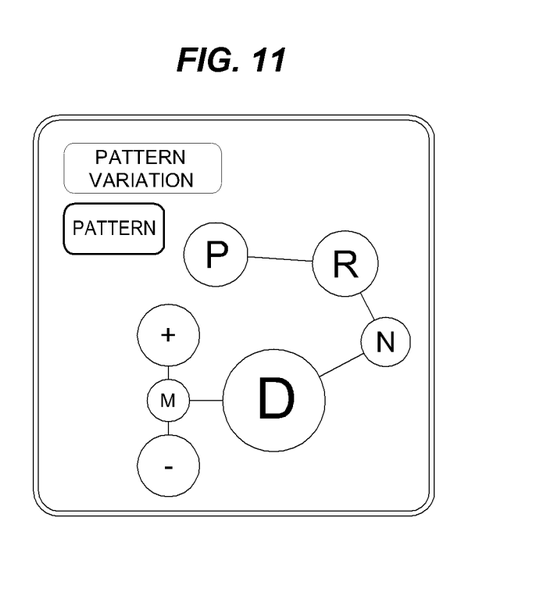
FIG. 11, FIG. 12 and FIG. 13 are views showing exemplary varied shift patterns according to the present invention.
Figure 12:
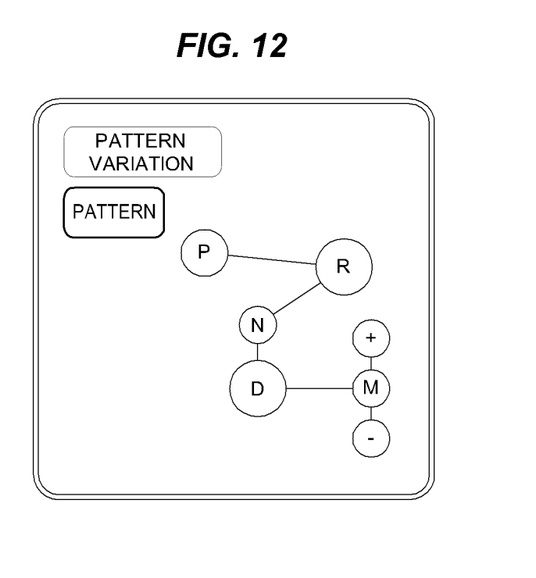
Figure 13:
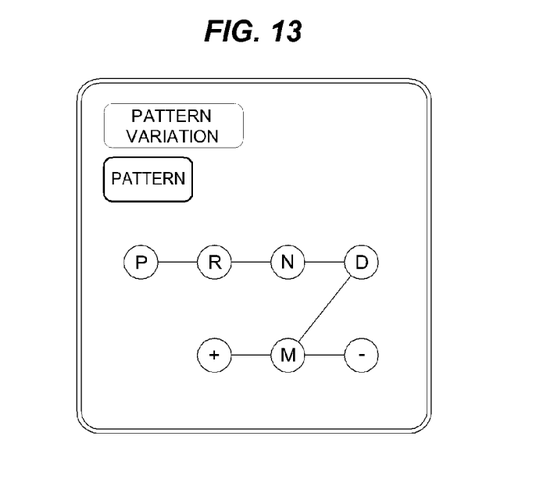

FIGS. 11 to 13 are views showing the varied shift patterns as described above. As shown in the drawings, according to the smart touch type electronic auto-shift lever of the present invention, the shift patterns displayed on the touch screen may be varied randomly or intentionally by a touch operation thereof wherein the shift patterns may be varied properly for a user, for example, the shift pattern may be varied to a circular pattern shown in FIG. 11, a gate pattern shown in FIG. 12 or a horizontal pattern shown in FIG. 13, thereby improving convenience thereof.

Figure 14:
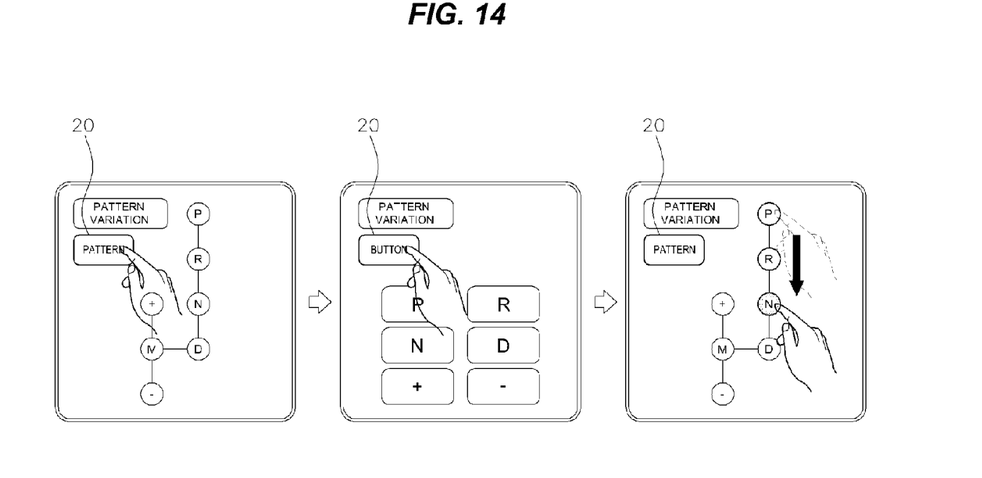
FIG. 14 is a perspective view showing another exemplary smart touch type electronic-auto shift lever according to the present invention.

FIG. 14 is a view showing a smart touch type electronic-auto shift lever according to various other embodiments of the present invention. According to the present invention, the shift pattern may be varied by touching a conventional pattern arrangement mode of shift stages and a random arrangement mode, for example, a button mode. In this case, the mode may be converted by a button 20 for converting the mode displayed on the touch screen in accordance with the separate information of the button for converting the mode provided by the shift stage controller.

The information of the button for converting the mode may include the image of the button 20 for converting the mode displayed on the touch screen, as shown in FIG. 14, and the information of the location to be displayed. Accordingly, the button 20 for converting the mode is displayed at a random location on the touch screen and the pattern mode is converted into the button mode when the touch is input, allowing the mode conversion of the shift pattern when the touch is input.

At this time, the shift stage controller pre-sets the relative location information between the shift stages as a first relative location information (for example, a conventional pattern mode) and a second relative location information (button mode pattern) and the respective relative location information is cross-converted when the button for converting the mode is input, thereby converting the modes.

According to the present invention, the shift operation of the electronic shift lever is performed through the touch screen and thus the electronic shift lever is configured simply, operational sense is improved and manufacturing cost can be saved.

Further, according to the present invention, a user can vary the shift pattern, the size of the button for shift, the location and the arrangement thereof, which are provided through the touch screen, thereby providing the shift pattern in accordance with different preferences of user.

Meanwhile, according to the smart touch type electronic auto-shift lever of the present invention, the operator is formed with the touch screen, and thus does not require a space occupied by a conventional shift lever, thereby improving a package performance thereof. Accordingly, the receiving space inside a vehicle can be increased.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A smart touch type electronic auto-shift lever, comprising:
   a shift stage controller which is connected to a controller of an electronic auto-transmission of a vehicle; and
   a touch screen which is arranged on a console of a vehicle and is connected to the shift stage controller to display information of a shift pattern received from the shift stage controller and transmit input information produced by a touch to the shift stage controller,
   wherein the shift stage controller generates the information of the shift pattern including the shift pattern and transmits it to the touch screen, and generates stage shift information allotted to the input information received from the touch screen and transmits it to the controller of the electronic auto-transmission of the vehicle.

2. The smart touch type electronic auto-shift lever of claim 1, wherein the shift stage controller:
   stores the shift stage information of shift stages including P stage, R stage, N stage, D stage, M stage, + stage and − stage, location information including a location where a shift stage contained in the shift stage information is to be displayed and relative location information including relative locations between respective shift stages contained in the shift stage information, as pre-set information;
   generates the information of the shift pattern based on the shift stage information, the location information and the relative location information; and
   transmits the information of the shift pattern to the touch screen.

3. The smart touch type electronic auto-shift lever of claim 2, wherein the relative location information is configured by storing the relative locations of the respective shift stages for the P stage, R stage, N stage, D stage and M stage to be arranged in sequence among the shift stages contained in the shift stage information, as pre-set information.

4. The smart touch type electronic auto-shift lever of claim 2, wherein the shift stage controller provides information of a button for varying pattern to the touch screen, the touch screen displays the button for varying the pattern based on the information of the button for varying the pattern, and the shift stage controller controls the shift pattern to be varied in accord with input of the button for varying the pattern.

5. The smart touch type electronic auto-shift lever of claim 3, wherein the shift stage controller generates the stage shift information and outputs it only when the input information received from the touch screen is input in sequence along a sequence arrangement of P stage, R stage, N stage, D stage and M stage.

6. The smart touch type electronic auto-shift lever of claim 2, wherein:
   the relative location information includes a first relative location information and a second relative location information, which set different shift patterns, respectively, as pre-set information,
   the shift stage controller provides information of a button for converting a mode to the touch screen,
   the touch screen displays the button for converting the mode based on the information of the button for converting the mode, and
   the shift stage controller controls the relative location information to be cross-converted into one of the first relative location information or the second relative location information in accord with input of the button for converting the mode.

7. The smart touch type electronic auto-shift lever of claim 3, wherein the shift stage controller provides information of a button for varying pattern to the touch screen, the touch screen displays the button for varying the pattern based on the information of the button for varying the pattern, and the shift stage controller controls the shift pattern to be varied in accord with input of the button for varying the pattern.

\* \* \* \* \*